(12) United States Patent
Solheim

(10) Patent No.: US 11,614,367 B2
(45) Date of Patent: Mar. 28, 2023

(54) CHARACTERIZING TROPOSPHERIC BOUNDARY LAYER THERMODYNAMIC AND REFRACTIVITY PROFILES UTILIZING SELECTED WAVEBAND INFRARED OBSERVATIONS

(71) Applicant: Fredrick S. Solheim, Boulder, CO (US)

(72) Inventor: Fredrick S. Solheim, Boulder, CO (US)

( * ) Notice: Subject to any disclaimer, the term of this patent is extended or adjusted under 35 U.S.C. 154(b) by 277 days.

(21) Appl. No.: 16/974,132

(22) Filed: Oct. 13, 2020

(65) Prior Publication Data

US 2021/0041299 A1    Feb. 11, 2021

Related U.S. Application Data

(63) Continuation-in-part of application No. 16/350,267, filed on Oct. 23, 2018, now abandoned, which is a
(Continued)

(51) Int. Cl.
*G01J 5/52*    (2022.01)
*G01J 5/53*    (2022.01)
(Continued)

(52) U.S. Cl.
CPC ............ *G01J 5/53* (2022.01); *G01J 5/0003* (2013.01); *G06F 18/214* (2023.01); *G06N 3/02* (2013.01);
(Continued)

(58) Field of Classification Search
CPC .... G01J 5/52; G01J 5/53; G01J 5/0003; G01J 5/802; G01J 5/804; G01J 2005/0074;
(Continued)

(56) References Cited

U.S. PATENT DOCUMENTS

| 4,225,230 A | 9/1980 | Dostoomian |
| 4,873,481 A | 10/1989 | Nelson et al. |

(Continued)

OTHER PUBLICATIONS

Howard E. Bussey, Measurement of Variatioins in Atmospheric Refractive Index With an Airborne Microwave Refractometer, p. 171-178 (1953).
(Continued)

*Primary Examiner* — Tung S Lau
(74) *Attorney, Agent, or Firm* — Harold A. Burdick

(57) ABSTRACT

Apparatus and methods are disclosed utilizing selected infrared waveband observations to determine selected profiles of interest. A correlative system is constructed and installed at a processor. Thermal and refractivity profiles and structure in a waveband of interest are extracted from observed infrared spectrum single waveband observations received for processing at the processor by the correlative system. The output provides the selected profiles of interest in the waveband of interest. The apparatus includes an infrared receiver and means for measuring angular displacement of received emissions relative to a horizon. The processor converts received emission into equivalent Planck blackbody temperatures across the observations and correlates structure and vertical distribution of the temperatures to provide thermodynamic and refractivity profiles of interest.

18 Claims, 9 Drawing Sheets

Related U.S. Application Data continuation-in-part of application No. 14/545,003, filed on Mar. 16, 2015, now abandoned.

(51) Int. Cl.
- *G01J 5/00* (2022.01)
- *G06N 3/02* (2006.01)
- *G06F 18/214* (2023.01)
- *G01J 5/80* (2022.01)

(52) U.S. Cl.
CPC .............. *G01J 5/802* (2022.01); *G01J 5/804* (2022.01); *G01J 2005/0074* (2013.01); *G01J 2005/0077* (2013.01)

(58) Field of Classification Search
CPC ............ G01J 2005/0077; G01J 5/0803; G01J 5/0865; G01J 5/602; G01J 5/007; G06F 18/214; G06N 3/02; G06N 3/084; G06V 10/143; G06V 10/764; G06V 10/774; G06V 10/82; G01W 1/02
See application file for complete search history.

(56) References Cited

U.S. PATENT DOCUMENTS

| | | | |
|---|---|---|---|
| 4,885,709 A | 12/1989 | Edgar | |
| 4,965,573 A | 10/1990 | Gallagher | |
| 5,526,676 A | 6/1996 | Solheim et al. | |
| 5,612,901 A | 3/1997 | Gallegos et al. | |
| 5,621,526 A | 4/1997 | Kuze | |
| 5,715,684 A | 2/1998 | Watanabe et al. | |
| 5,868,496 A | 2/1999 | Spitzberg | |
| 6,035,710 A | 3/2000 | Hutchison et al. | |
| 7,052,176 B2 | 5/2006 | Stephan et al. | |
| 7,353,690 B2* | 4/2008 | Solheim | G01K 11/006 374/E11.003 |
| 7,369,229 B2* | 5/2008 | Bissett, III | G01N 21/31 356/328 |
| 7,472,590 B2 | 1/2009 | Solheim et al. | |
| 8,339,600 B2* | 12/2012 | Chrisp | G01J 3/2823 356/328 |
| 8,669,876 B2* | 3/2014 | Anderson | G08B 21/086 340/541 |
| 10,670,784 B2* | 6/2020 | Wang | G01S 7/4816 |
| 11,441,951 B2* | 9/2022 | Solheim | G01J 5/0802 |
| 2001/0010360 A1 | 8/2001 | Oda | |
| 2004/0130780 A1* | 7/2004 | Harvey | G02B 13/146 359/642 |
| 2006/0164063 A1 | 7/2006 | Solheim | |
| 2008/0316347 A1 | 12/2008 | Gamal | |
| 2010/0292906 A1 | 11/2010 | Girouard | |
| 2011/0218734 A1* | 9/2011 | Solheim | G01W 1/00 702/3 |
| 2012/0310578 A1 | 12/2012 | Solheim | |
| 2016/0071420 A1 | 3/2016 | Heilman | |

OTHER PUBLICATIONS

Susan L. Ustin, Using Imaging Spectroscopy to Study Ecosystem Processes and Properties, Jun. 2004/vol. 54 No. 6, pp. 523-533.

Y. Luo, Realization of Refractive Polarizing Fourier Transform Spectrometer for Cosmic Microwave Background Polarization Observation, 2010 IEEE, 2 pages.

* cited by examiner

CHARACTERIZING TROPOSPHERIC BOUNDARY LAYER THERMODYNAMIC AND REFRACTIVITY PROFILES UTILIZING SELECTED WAVEBAND INFRARED OBSERVATIONS

RELATED APPLICATION

This Application is a Continuation-In-Part Application of application Ser. No. 16/350,267 filed on Oct. 23, 2018 by the inventor herein and entitled CHARACTERIZING TROPOSPHERIC BOUNDARY LAYER THERMODYNAMIC AND REFRACTIVITY PROFILES UTILIZING MULTIBAND INFRARED OBSERVATIONS, which now application is a Continuation-In-Part of application Ser. No. 14/545,003 filed on Mar. 16, 2015 by the inventor herein and entitled CHARACTERIZING TROPOSPHERIC BOUNDARY LAYER THERMODYNAMIC AND REFRACTIVITY PROFILES UTILIZING MULTIBAND INFRARED OBSERVATIONS.

FIELD OF THE INVENTION

This invention relates to passively characterizing atmospheric characteristics, and, more particularly, relates to methods and apparatus for such characterization using infrared (IR) spectrum spatial observations.

BACKGROUND OF THE INVENTION

Inaccurate characterization of tropospheric meteorological parameters, such as the vertical profiles and structure of temperature, pressure, water vapor and refractivity, and of electromagnetic propagation, particularly over water, has long resulted in difficulty deploying systems using infrared (IR), visible and ultraviolet, and radio/RADAR wavebands. Since the effects in each differ due to the spectral real (phase delay) and imaginary (absorption) components of refractivity characteristics of water vapor and the dry constituency of the troposphere, such difficulties have been especially acute for oceangoing operations such as naval needs for passive continuous characterization of the evaporation layer in the entire optical region and in the radio/radar regions of the electromagnetic spectrum. This is particularly true of radio and RADAR bands where no simple observational method exists for passively determining refractivity.

Electromagnetic ducting over the surface of the ocean occurs when the refractivity gradient is high in the first tens or hundreds of meters of altitude. This phenomenon can cause horizontal radio and optical propagation over longer than normal distances. Moreover, certain refractivity gradients can cause blind segments at different elevations above the horizon with resulting loss of the ability to make visual, radio, and/or radar contact. This phenomenon can also occur over land when high refractive gradients occur (e.g., optical mirages seen in the visible region over hot surfaces). The major constituents in tropospheric refractivity are water vapor and the dry constituency in the radio wavebands as well as in certain different segments of the IR spectrum.

The threshold for long path ducting to occur, for curvature of the electromagnetic propagation to match or exceed that of the earth, is the following refractivity gradient, with the refractivity decreasing with altitude:

$$-dn/dh \geq 157N \text{ units/km}$$

N units are defined as $(n-1) \times 10^6$, where n is the index of refraction. Complex gradients can induce other effects. This phenomenon can blind vessels to threats in their environment, make aircraft recovery difficult, or (undesirably) make them visible in various wavebands at long ranges. The blinding is analogous to optical mirages over hot surfaces wherein the distant horizon is not visible. This ducting can also occur in arctic regions, interfering with radio communications.

Operationally, shipboard refractivity profiling has heretofore been accomplished using radiosondes which measure the temperature and relative humidity as a function of the local pressure along the radiosonde trajectory. But radiosondes are difficult to manage from ships, contain a radio transmitter and are therefore not passive, have long rise times, and define a single trajectory in space. RADAR clutter and atmospheric models are also utilized to estimate refractive effects. All of these current methods suffer from lack of accuracy, timeliness and covertness. Furthermore, there may be azimuthal gradients in the refractivity effects that a radiosonde or models would not define.

Measurement of ducting using narrow beam microwave radiometer systems (some with dual polarization, horizontal and vertical) in the <100 GHz range has been attempted. However, this methodology yields a single-pixel measurement, and the dwell (stare) time to obtain good resolution is on the order of seconds for each pixel. Large antennas to narrow the beam width and shipboard antenna stabilization are required to obtain these long-stare resolute measurements at the horizon (on the order of minutes for a vertical slice of multiple pixels) and antenna side lobes confuse the observations.

More generally, these inaccurate characterizations debilitate accurate meteorological analysis. The profiles of temperature and water vapor are fundamental measurements of radiosonde weather balloons currently used for tropospheric profiling, and are primary inputs to numeric weather models for nowcasting and forecasting. Radiosonde weather balloon releases are typically conducted only every 12 hours and at various distant locations. There are currently eighty radiosonde stations sited in the continental United States, each having an operating cost of about $150,000 per year. These radiosondes use large amounts of helium at each launch thus adding to depletion of limited helium reserves. Other methods for gathering this information include SODARS, wind profilers with RASS, and laser sounders. However, none of these methods is passive, and are therefore not suitable for unobtrusive and/covert uses (such military application, for example). All are costly, and have intrusive environmental impacts, are cumbersome and thus not portable, require excessive personnel to deploy and operate, and typically provide only local or temporally and spatially sparse data.

Water vapor plays an important role in atmospheric chemistry involving pollutants. Temperature inversions can trap pollutants in the surface layer, or conversely, deny transported pollutants from reaching the surface (e.g., LA basin pollutants flowing over Las Vegas). The Potential Temperature Theta and Equivalent Potential Temperature Theta-E, measures of atmospheric stability, can be calculated from retrieved temperature profiles. These measures determine if pollutants will be mixed upward from the surface, if wind scouring of the surface is enabled that would remove pollutants. Nowcasting and forecasting of these effects could be greatly enhanced by greater availability of such data more frequently and at more locations. Moreover, these measures can define and nowcast laminar or turbulent air flow, important to wind energy windmill operation. Laminar flow enables optimum wind energy harvesting, whereas turbulent flow can damage wind turbines and cause their failure.

Advance warning of such turbulent flow could thus be utilized to avoid such damage and failure.

Microwave radiometers are known in the field of atmospheric sensing. For example, U.S. Patent publication No. US2011/0218734 teaches an application of a microwave radiometer receiver capable of receiving frequencies in a band adjacent to or across a selected atmospheric millimeter wave water vapor line. While microwave radiometer technology also performs atmospheric sensing, its application is distinctly different in its method, apparatus, science of data retrieval, skill, and performance from the longwave infrared profiler subject of this Patent Application. Because of the inherent requisite wide antenna beamwidths and field-of-view of microwave radiometers, they are unable to make measurement of the boundary layer ducting channel. In the 60 year history of microwave radiometry technology, never has it even approached the skill necessary. Physical principals of radiometers preclude such skill. Only LWIR imaging systems, with their very high spatial resolution and "snapshot" capture of highly defined images at short wavelengths, are capable of resolving refractivity profiles. Some of the differences between microwave atmospheric sensing technology generally and as taught in the applied reference specifically and the longwave profiler of this invention are enumerated below:

the microwave technology uses a waveguide radio receiver tuning and receiving multiple wavebands, whereas the longwave infrared instrument is an optical system typically having a Germanium focusing lens and a longwave infrared detector array;

microwave technology is a single beam (and thus a single "pixel") system, whereas the longwave infrared technology herein is a multiple pixel image capture technology, typically 640×480 pixels, or 307,200 pixels;

the microwave wavelengths are typically in the range of 1000 times longer than the longwave infrared, and interact with the atmosphere and its contained constituents differently. Because of the long wavelengths, the skill and resolution of the microwave technology is less than the longwave infrared technology;

the microwave technology makes observations in the Rayleigh-Jeans portion of the emission spectrum, whereas the longwave infrared technology observes in the Planck radiance region of the emission spectrum. Again, vastly different mathematics and thus instrumentation and processing are required;

because of the microwave wavelengths, antenna beamwidths of many degrees are inherent, whereas the pixel widths of the longwave infrared instrument are about 0.03 degrees. This translates to large antenna apertures required for the microwave instrument, and small lenses for use with the longwave infrared instrument;

the independent information measures (Eigenvalues) of the microwave instrument are 3 to 4, whereas the longwave infrared instrument herein makes 8 independent measures (Eigenvalues), resulting in greatly increased skill, detail and definition in the profiles;

the microwave technology determines the vertical distribution of temperature and water vapor by observing at a required large number of bands/frequencies (typically 35 microwave frequencies) in order to measure the emission profile of the broadened spectral lines, whereas the longwave infrared technology uses a single infrared band and makes no line profile measurement;

by measuring across the pressure broadened emission line profiles at a single elevation angle above the horizon, the microwave technology measures the pressure broadening and variable attenuation of the water vapor and oxygen emission lines over a broad frequency profile of the lines, whereas the longwave infrared technology simultaneously makes a single broad band measurement across a myriad of water vapor and carbon dioxide emission lines at a large number of observation elevation angles (up to 640 angles) above the horizon. A vastly different observation routine and processing challenge; and the observation cycle time of the microwave instrument is on the order of minutes, whereas the longwave infrared instrument can cycle at 30 Hz, 30 times each second, perhaps several thousand times faster than the microwave technology.

As may be appreciated from the foregoing, apparatus and methods for tropospheric boundary layer profiling could thus still be utilized having improved accuracy, timeliness and overall utility, including refractivity profiling to, among other things, define azimuthal gradients in the refractivity effects, and which are more easily deployed and utilized (on ocean going vessels, for example).

SUMMARY OF THE INVENTION

The instant invention provides a fully passive, all weather, day/night operational apparatus and methods having the ability to characterize tropospheric meteorological parameters including the vertical profiles and structure of temperature, pressure, water vapor, and refractivity through either of single waveband infrared (a single waveband segment of the IR waveband) or multiband infrared imaging of the atmosphere. In one particular implementation, the entire depth of a refractive layer can be characterized. The invention may be deployed for continuous operation and implemented to be rapidly steerable and readily operable in high sea states. The methods and apparatus define a boundary layer refractivity profile and determine its effect upon the full spectrum of infrared, visible, ultraviolet, and radio/RADAR electromagnetic propagation. The methods and apparatus are suitable for unobtrusive and/or covert uses, are inexpensive to deploy and operate, have no environmental impact, are highly adaptable and portable, are fast cycling, low power and low maintenance, can be undertaken by a single operator or by automation, and thus can be implemented frequently and across a spatially meaningful (sited nearer to one another) network.

The apparatus and methods are adapted for characterization of tropospheric electromagnetic propagation in all wavebands, for characterizing the refractivity and height of the evaporation duct in the infrared wavelength waveband from IR observations (either single waveband or multiband observations may be utilized, though the single waveband approach is preferred), and for enabling characterization of IR, UV and visible propagation in the tropospheric boundary layer. Extraction of the water and temperature profiles from the IR observations enables modeling of electromagnetic propagation effects in the troposphere in all radio and RADAR wavebands.

The apparatus and methods are adaptable to greater availability at a greater number of locations of air quality data for forecasting and nowcasting using water vapor and temperature profiles. Nowcasting laminar or turbulent air flow is also made possible.

The preferred methods of this invention provide a way to utilize infrared spectrum segment spatial observations to determine any of the wavelength dependent refractivity profiles of interest, water vapor profiles of interest, and temperature or pressure profiles of interest. The method involves constructing a correlative system on a computing device by correlating a priori infrared observations (images and/or vertical gradients) in a selected waveband of interest with at least one of a priori refractivity profiles across the electromagnetic spectrum and a priori water vapor and temperature profiles. Thermal profiles and structure are extracted from observed infrared spectrum single waveband spatial observations received at a processor having the correlative system installed thereon. After processing the thermal profiles utilizing the correlative system, selected ones of the profiles of interest in the selected waveband of interest are output from the processor.

More particularly, a preferred method for characterizing refractivity profile and electromagnetic propagation in the tropospheric boundary layer utilizing infrared imaging is thus provided. The correlative system is preferably a neural network trained utilizing refractive component profiles of soundings and infrared temperature observations forward modeled across a selected IR waveband from refractive atmospheres. Infrared observations of the boundary layer of interest obtained have selected waveband data thereof measured or modeled, infrared thermal profiles extracted therefrom in the waveband of interest.

The apparatus for making infrared spectrum observations to determine any of refractivity profiles, water vapor profiles, and temperature or pressure profiles of interest of this invention includes a noncontact infrared imaging receiver for receiving emissions indicative of infrared spatial observations across a selected atmosphere. While the receiver may include means for isolating component emission from regions of the infrared spectrum due substantially solely to water vapor, to dry constituency of the atmosphere, and to a region essentially free of water vapor and dry constituency emissions and for providing output indicative thereof, in preferred embodiments this is found unnecessary. Mechanism for controlling and measuring angular displacement of received emissions relative to a horizon associated with the receiver and having an output indicative thereof is associated with the receiver. A processor receives the outputs and includes a system for converting received component emission into equivalent Planck blackbody temperatures across the spatial observations and for correlating structure and vertical distribution of the temperatures to provide the profiles of interest.

This invention enables full characterization of tropospheric refractive effects in the optical (infrared, visible, ultraviolet) and radio/RADAR segments of the electromagnetic spectrum, while simultaneously characterizing the spatial distribution of underlying refractors (water vapor and the dry constituency of the atmosphere). Observations of the thermal emission in the vicinity of the horizon, preferably at a selected waveband in the infrared spectrum, but also possibly at various wavelengths in the infrared waveband are obtained. Knowledge thus obtained of the refractivity, water vapor and temperature can then be utilized in ray tracing or wave propagation methods to determine visibility or lack thereof and propagation characteristics in the radio and RADAR wavebands as well as across the entire infrared and visible parts of the electromagnetic spectrum.

It is therefore an object of this invention to provide apparatus and methods for tropospheric boundary layer profiling and determination of various effects.

It is another object of this invention to provide apparatus and methods for tropospheric boundary layer refractivity profiling and determination of its effect upon infrared, visible, ultraviolet, and radio/RADAR electromagnetic propagation.

It is another object of this invention to provide full characterization of tropospheric refractive effects in the optical (infrared, visible, ultraviolet) and radio/RADAR segments of the electromagnetic spectrum, while simultaneously characterizing the spatial distribution of underlying refractors (water vapor and the dry constituency of the atmosphere).

It is another object of this invention to provide a fully passive, all weather, day/night operational apparatus and methods with the ability to characterize the entire depth of a refractive layer and range information on the refractivity layer.

It is yet another object of this invention to provide methods and apparatus for tropospheric boundary layer profiling that are suitable for unobtrusive and/covert uses, are inexpensive to deploy and operate, have no environmental impact, are highly adaptable and portable, are fast cycling and low power, can be undertaken by a single operator or by automation, and thus can be implemented frequently and across a spatially meaningful network.

It is still another object of this invention to provide apparatus and methods for tropospheric boundary layer profiling that are adaptable to greater availability at a greater number of locations of air quality data and/or laminar or turbulent air flow data.

It is still another object of this invention to provide methods and apparatus for utilizing selected opportune segments of infrared spectrum spatial observations to determine any of refractivity profiles of interest, water vapor profiles of interest, and temperature or pressure profiles of interest.

It is yet another object of this invention to provide boundary layer refractivity profiling in a selected waveband of interest that is accurate and fast while allowing covert utilization.

It is still another object of this invention to provide methods for characterizing refractivity profile and electromagnetic propagation in a tropospheric boundary layer utilizing either of single waveband or multiband infrared imaging.

It is another object of this invention to provide an apparatus for characterizing tropospheric boundary layer thermodynamic and refractivity profiles of interest utilizing selected waveband infrared observations that includes a passive noncontact infrared image detection device for receiving and making observations of infrared emissions in the 8 to 14 micron range waveband and for providing output indicative thereof, means for measuring angular displacement of received emissions relative to a horizon associated with the detection device and providing spatial output indicative thereof, and a processor for receiving the outputs and including means for converting output indicative of received and observed infrared emissions into equivalent Planck blackbody temperatures and for correlating structure and vertical distribution of the temperatures to provide the profiles of interest.

It is still another object of this invention to provide an apparatus for characterizing tropospheric boundary layer thermodynamic and refractivity profiles of interest utilizing selected waveband infrared observations including a passive noncontact thermal infrared camera for receiving and making observations of infrared emissions in the 8 to 14 micron range waveband and for providing output indicative thereof, means for measuring spatial displacement of received emissions relative to a horizon associated with the camera and providing output indicative thereof, and a processor for receiving the outputs and having programming including a correlative system constructed by correlating a priori infrared spatial observations in waveband of interest with a priori refractivity profiles across the electromagnetic spectrum and a priori water vapor and temperature or pressure profiles and means for processing the outputs with the correlative system to thereby obtain profiles of interest including boundary layer refractivity profiles of interest, water vapor profiles of interest, and temperature or pressure profiles of interest.

It is yet another object of this invention to provide a method for characterizing refractivity profile and electromagnetic propagation in a tropospheric boundary layer utilizing selected waveband infrared imaging that includes training a correlative network utilizing refractive component profiles of soundings at desired wavelengths and infrared temperature images forward modeled from refractive atmospheres, obtaining infrared images of the atmosphere from a selected waveband of interest, measuring or modeling selected waveband data from the infrared images and extracting infrared thermal profiles therefrom in the waveband of interest, and processing the thermal profiles at the correlative network to obtain refractivity profiles at the waveband of interest.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
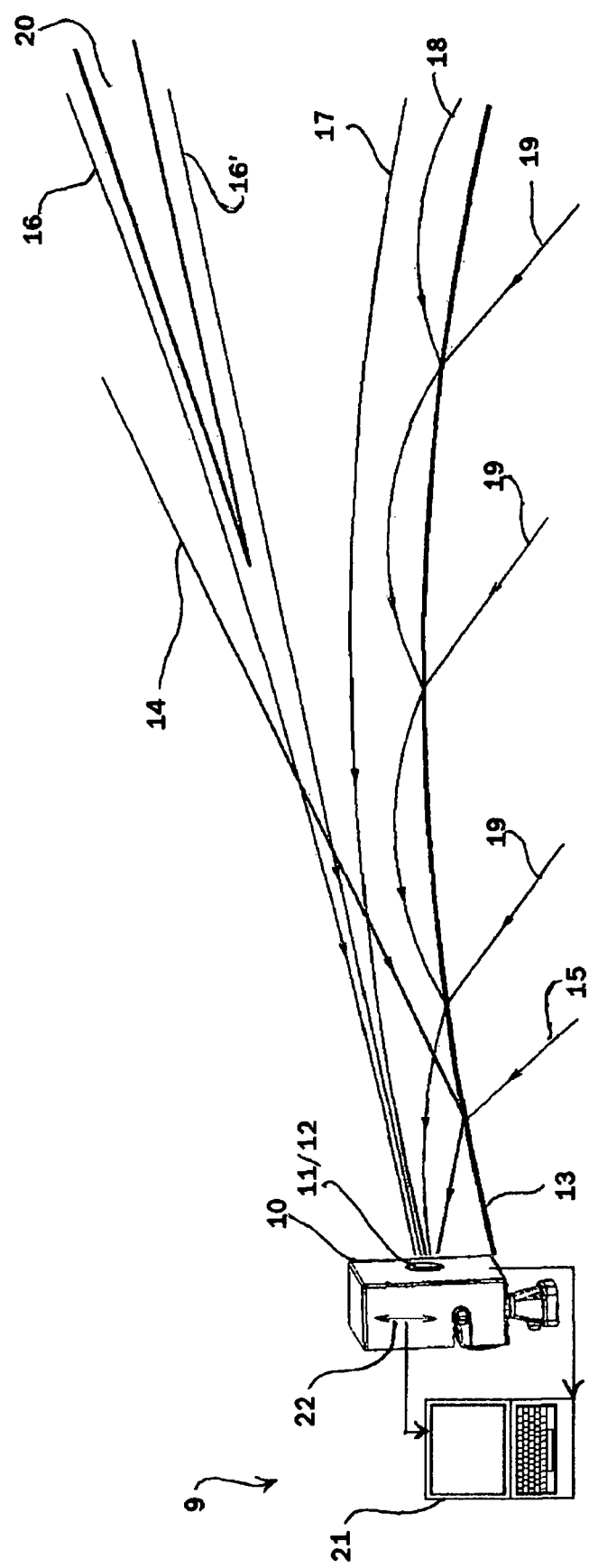
FIG. 1 is an illustration of the apparatus of this invention and showing effects of various refractive gradients upon electromagnetic propagation.

FIG. 1 in part illustrates effects of various refractive gradients upon electromagnetic propagation over water. Observed in infrared spatial observations (in this case infrared images but which could alternatively be vertical gradients) of the vicinity of the horizon under such conditions are horizontal layers (or quasihorizontal layers in the presence of horizontal gradients) of optical paths beginning upward from below the optical horizon and progressing upward (with similar effects upon propagation paths in the other optical and radio/RADAR bands). The electromagnetic flux from these layers may originate from over long distances over the ocean, may originate from the ocean, may make multiple reflections off the ocean surface and the under-side of the ducting layer, or may originate from above the horizon in the cold sky. They therefore manifest as layers of differing temperatures in infrared images.

FIG. 1 (illustrating a trapping of electromagnetic radiation in the ducting layer at 18 and radiation emanating from the sea at 19, at look angles at or slightly below the horizon) shows IR or radio radiation reflected from the surface of the ocean and which may by slightly polarized. Such radiation may scintillate in accord with the sea state. Contributing to the reflected signal will be IR radiation emanating from within the sea. An IR camera with an approximately 30 millisecond camera frame rate will capture these scintillations. Horizontal polarization (H) will largely be reflected radiation from the sky, whereas the vertical polarization (V) will contain slightly more radiation than the horizontal at sea temperature originating from the sea as shown at 15/19 in accord with the Fresnel Equations for refraction/reflection. This propagation may be trapped by a high refractive gradient and may experience multiple reflections within the trapping duct as shown in FIG. 1 at 18.

For long path ducting conditions slightly above the trapped multiple reflections (wherein the propagation path is ducted for long distances just above the surface as shown in FIG. 1 at 17), super-refraction occurs and the signal from just above that reflected from the sea will be at a radiated temperature of the long path through air just above the sea surface.

For look angles just above the ducting effect as shown in FIG. 1 at 16 wherein the propagation path is not trapped in a duct, normal refraction occurs and the radiation will emanate from a long path that originates from the sky. If the refractive profile creates sub-refraction as shown in FIG. 1 at 16' wherein the propagation path is curved upward, there then may be a somewhat abrupt transition in IR image temperature patterns observed in the vicinity of the horizon because of the so-called anomalous propagation (AP) blind segment 20. The blind sector may exist in the presence of super-refraction or when a look elevation exists wherein electromagnetic propagation does not reach the observer or observing instrument, and likewise one located in the blind segment cannot see the observer.

This "rainbow" of horizontal infrared temperature bands will be different for the various IR wavebands, depending upon whether water vapor, the dry constituency, both, or none, are in effect and to what extent, and will also vary as a function of the height of the infrared imager above the surface. The temperature image in the vicinity of the horizon may present as a smooth gradation across temperature scales, may be monotonic with increasing height, may have inflection points, and may have discontinuities that are characteristic of blind sectors.

The tropospheric IR transmission spectrum from 20 microns to near IR, where detectors and imaging systems are readily available, consists of so-called window regions segments of low refractivity and absorption interspersed with highly absorptive regions. The major absorbers (refractors) are water vapor and $CO_2$. By selecting regions of the IR spectrum absent the absorption and refraction of $CO_2$ but having suitable absorption and refraction by water vapor, refractive effects of water vapor can be obtained. Likewise, by selecting parts of the spectrum absent the absorption and refraction by water vapor, refractive effects of $CO_2$ can be obtained. By selecting a "window region" of the IR spectrum, the relatively refraction-free effects can be measured.

Figure 2A:
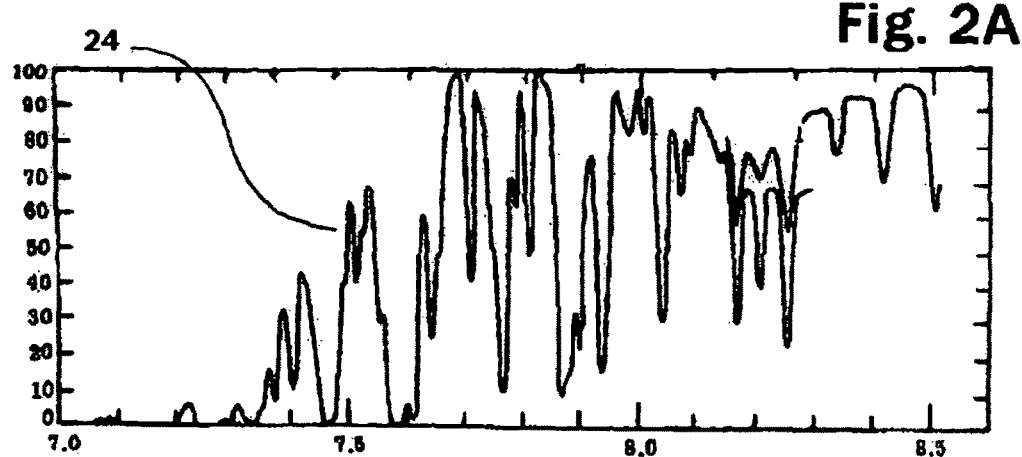
FIGS. 2A through 2C are graphical illustrations of measured infrared transmission across various spectral selected waveband of interest.
Figure 2B:
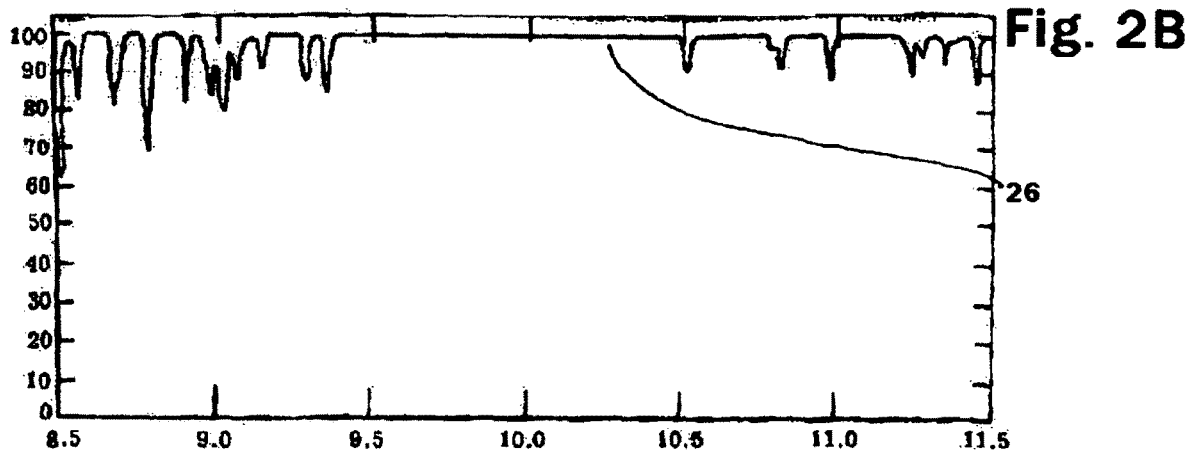
Figure 2C:
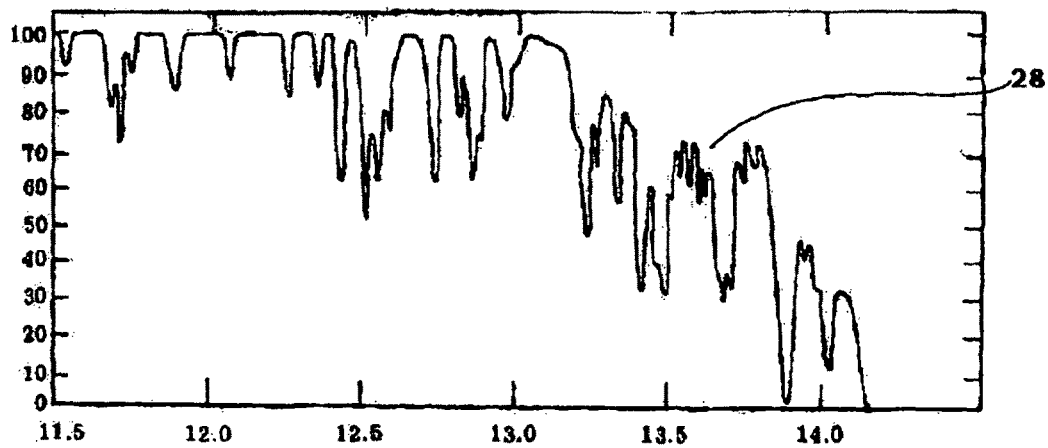

A horizontal low spectral resolution infrared transmission spectrum in percent through 300 meters of a typical sea level atmosphere is shown in FIGS. 2A through 2C. An atmospheric window between 9.5 and 11.3 microns 26 is shown in FIG. 2B wherein the gaseous atmosphere is fairly transparent and does not significantly absorb or emit. At wavelengths shorter than this window, in the vicinity of 7.5 microns at 24 (FIG. 2A), atmospheric water vapor absorption dominates absorption and emission. At wavelengths longer than about 13 microns (at 28 in FIG. 2C), the dry constituency of the atmosphere, mostly $CO_2$, generally dominates absorption and emission. Through measurements of the thermal emissions across vertical elevation angles, the profiles of refractivity, water vapor, and temperature can be separately extracted. It is demonstrated by the Kramers Kronig relations that refractivity in these regions exhibits proportionality to the absorption, and thus emission.

While not preferred and in most cases unnecessary, by making the appropriate measurements in several regions of the spectrum, the refractive effects due to water vapor and the dry constituency can be determined as well as the profiles of water vapor and of the dry constituency. Further, knowing the surface barometric pressure, the vertical pressure and temperature profiles of the atmosphere can be extracted.

Photons in the infrared are hundreds of times more energetic than in the microwave region, and are much more abundant at ambient temperatures as they are near the peak of the Planck Curve, whereas microwave emissions are on the far tail of this curve in the Rayleigh-Jeans region. Thus the IR signal levels are about three orders of magnitude higher than in the microwave region. Fast sequences of high resolution IR images are possible because of this, and because detector arrays and optical systems are readily available. IR wavelengths are roughly 1/1000 of those in the microwave region allowing small apertures and essentially eliminating side lobes, and readily allowing narrow field of view and high angular resolution. Such a system could be easily scanned azimuthally. The Planck blackbody emission formula (Planck's Law) is:

$$I(\lambda, T) = \frac{2\pi hc^2}{\lambda^5 [e^{hc/\lambda kT} - 1]}$$

I is radiated power per wavelength interval,
λ is the wavelength of the radiation
h=Planck's constant, 6.62606896(33)×10⁻³⁴ joule–sec
k is Boltzmann's constant, 1.3806504×10⁻²³ joules/Kelvin
T is the temperature in Kelvins,
c is the speed of light, 299, 792, 458 meters/sec This expression peaks in emission intensity around 10 microns at ambient temperatures. Note that the IR emission is related to absorption by Kirchoff's Law (at steady state, emission energy equals absorption), and refractivity is related to absorption by the Kramers-Kronig relations for complex permittivity, as derived from Cauchy's Theorem, thereby allowing an additional method for determining refractivity using the absorption properties of the atmosphere:

$$Re(\epsilon(\omega)) = 1 + \frac{2}{\pi}\Pi\left(\int_0^\infty \frac{\omega' Im\epsilon(\omega')}{\omega'^2 - \omega^2}d\omega'\right) \quad Im(\epsilon(\omega)) = -\frac{2}{\pi}\Pi\left(\int_0^\infty \frac{Re\ \epsilon(\omega')-1}{\omega'^2 - \omega^2}d\omega'\right)$$

where Π denotes the principal part, and Re and Im are the real and imaginary parts of permittivity. Note that the real integral is refractivity, the imaginary is absorption.

As seen in FIG. 2, various segments of the IR spectrum are refracted separately by the dry constituency or by water vapor, or by neither or both. Separating these two effects with measurements in the IR allows for modeling radio/RADAR refractivity effects without having to make actual radio band measurements, as well as allowing modeling across the entire IR waveband. The three desired profiles T, RH and refractivity each dominate separate segment elevations of the thermal IR image. Thus, by obtaining the thermal IR signal at a plethora of elevation angles, the desire profiles can be separately determined. From that and with a line-by-line transmission model such as LowTran, ModTran, or HiTran, refractivity can be determined at any wavelength in the IR, other optical, and radio/RADAR wavebands.

Atmospheric refractivity in the radio region of the spectrum can be described by:

$$N = k_1 \frac{P_{dry}}{T} + k_2 \frac{P_{vapor}}{T} + k_3 \frac{P_{vapor}}{T^2}$$
$$= k_1 R_{dry}\rho_{dry} + k_2 R_{vapor} rho_{vapor} + k_3 R_{vapor} \frac{\rho_{vapor}}{T}$$

where $k_1$=77.60±0.05K/mb, $k_2$=70.4±2.2K/mb, and $k_3$=3.739±0.012×10⁵K²/mb.

The first ($k_1$) and second ($k_2$) terms are due to the degree to which gas atoms and molecules are polarized by displacement of electron clouds in the electromagnetic field relative to the nucleus, whereas the third ($k_3$) term is due to the orientation of the dipole moments water molecules by the electric and magnetic vectors of the radio propagation. The $k_3$ term dominates the $k_2$ term by about a factor of 20. At optical frequencies, the polar water molecules have too great a moment of inertia to react to the E fields, and that term is not present for some segments of the optical spectrum.

The following historic expression for optical refractivity, given by Edlen and subsequently improved by Ciddor and Mathar and others does not consider the refractivity of water vapor present in some segments of the IR waveband.

$$N = \frac{P}{T}\left(k_1 + \frac{0.584}{\lambda^2}\right)$$

To characterize tropospheric refractive effects upon electromagnetic propagation across multiple wavebands from radio to ultraviolet, a mechanism for determining the profiles of water vapor and temperature and resultant refractivity and absorption across these wavebands is needed. This can be accomplished through a method of mathematical inversion of the observed infrared temperature structure in IR waveband from infrared camera images at and above the horizon. This inversion of observations so obtained can be accomplished through several methods, all of which utilize infrared images of the troposphere in the vicinity of the horizon.

In a preferred embodiment of the apparatus 9 of this invention as shown in FIG. 1, an infrared receiver 10 for making infrared spectrum imaging spatial observations and which includes a focusing system 11 and image detection device 12 is positioned to capture images in the vicinity of the oceanic horizon and sea surface 13. These images are thermodynamic Planck blackbody emissions from sources that, depending upon the refractivity of the atmosphere, can include the sea surface 13, reflections from the sea surface that originate from the sky 14 combined with polarized emissions from the ocean 15, emissions directly from a propagation path originating in the sky 16 and 16', emissions traveling long distances along the sea surface 17, and emissions that have experienced multiple reflections 18 from the sea surface and contain some polarized emission from within the ocean 19. A blind segment 20 can also exist under certain conditions wherein that area of the sky is not visible, and an observer in this segment cannot see the imaging system.

Alternatively, receiver 10 could be configured as a single pixel device for making vertical gradient spatial observation. One example of such at embodiment would include a telescopic lens system feeding an infrared sensor detecting device such as an infrared thermometer (for example, a Melexis MLX 90614 family detector). In such case preferably a single waveband detector system would be employed, though a multiband grating and detector system could be used.

Images captured are processed at processor 21 into desired information that includes refractivity profiles in radio and RADAR and optical wavebands and transmission and propagation characteristics in those wavebands. The imaging system can be positioned at various heights above the surface of the ocean and have angular displacement controlled and measured by device 22 to better sample and increase information on the desired refractivity profiles and other observables.

Receiver 10 is thus a noncontact infrared receiver for receiving emissions indicative of infrared spatial observations across a selected atmosphere, and infrared waveband spatial observation detection device 12 is a passive device such as a noncontact IR thermometer or thermometers (each capable of receiving a single pixel at a time) or, preferably, a passive thermal infrared camera, in this case a single waveband IR imaging camera or multiples of cameras (capable of receiving multiple pixels).

While not preferred and for the most part unnecessary, systems of this invention could be band tuned with switchable polarizer and/or tunable or fixed filters and lens systems, an etalon device, multiple imaging detectors and/or other such mechanisms. In addition, apparatus 9 could be specifically adapted for making infrared spectrum observations to determine selected profiles of interest, including refractivity profiles, water vapor profiles, and temperature or pressure profiles, in selected wavebands of interest. Receiver 10 could be provided with mechanisms for isolating and measuring component emission from regions of the infrared spectrum as noted above due substantially solely to water vapor, to the dry constituency of the atmosphere, and to a region essentially free of water vapor and dry constituency emissions (utilizing, for example, hardware for selecting desired wavebands or bandpasses in the infrared at the receiver, such as fixed filters, tunable filters, diffraction gratings or the like).

Output indicative of the component emission from the receiver is received at processor 21. Device 22 is preferably adapted to control and measure location of the receiver, including height above an observational surface and angular displacement of received emissions (or observation/image components) relative to the geometric horizon, and to provide output indicative thereof to processor 21. Processor 21 receives these outputs and includes processing in accord with this invention for converting the component emission into equivalent Planck blackbody temperatures across the observations/images, as well as for correlating structure and vertical distribution of the temperatures to provide the profiles of interest as further disclosed hereinbelow.

Figure 3:
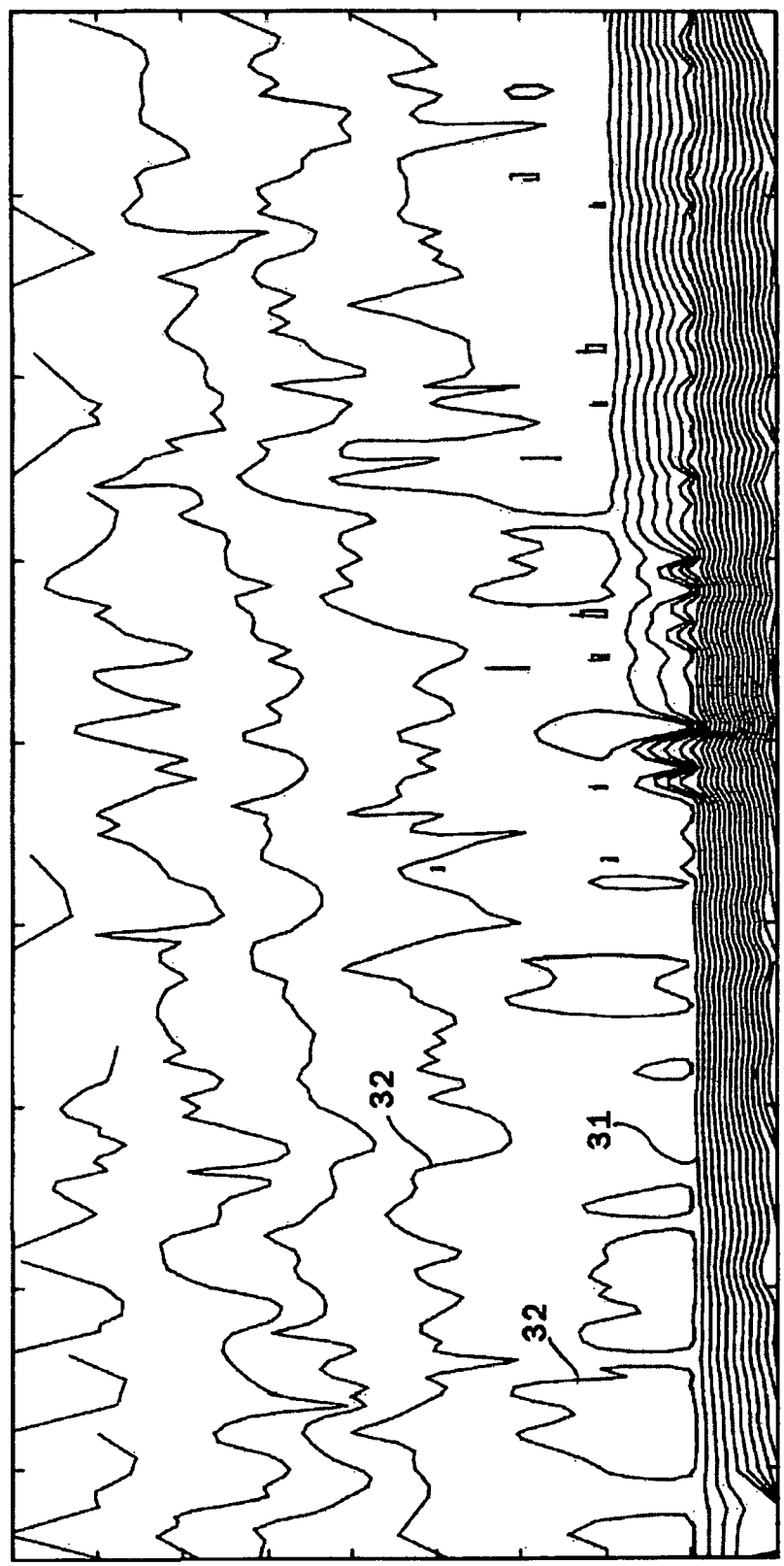
FIG. 3 is a contour plot generated from an infrared image of the ocean in the vicinity of the horizon.

Data for the typical temperature contour plot from an infrared image shown in FIG. 3 was gathered using an off-shore viewing image captured with a FLIR COTS 7.5 to 14 micron IR camera, 640×480 pixel microbolometer array, 25 degree FOV, 14 bit resolution at 30 Hz frame rate, with NEDT (resolution) better than 0.035K. The horizon is at 31, with the sky above this horizon. As shown by the temperature contours of isothermal infrared signal in the image at 32, because less atmosphere is being viewed through, sky temperature decreases with elevation angle of observation.

Thus, as may be appreciated from the foregoing, processing of high resolution single waveband digital images in the 6 to 15 micron region with relatively inexpensive infrared cameras can separate the refractivity due to water vapor and to the dry constituency of the atmosphere and enable modeling the refractivity effects in other optical wavebands and the radio/RADAR spectrum. The thermal information of the image can be processed by artificial neural networking or other mathematical inversion/interpretation processing such as linear or nonlinear regression or Bayesian maximum likelihood methods, each trained with modeled or a priori measured tropospheric thermodynamic profile data to correlate observed signatures with refractivity profiles. This extraction of desired parameters from observed data is termed "retrieval" of the parameters. Purely physical inversions are also possible, but inclusion of climatology data and other independent pertinent data increases the skill of the retrieval. The data output products are boundary layer water vapor, temperature/pressure and refractivity profiles at various IR, visible, and ultraviolet wavelengths and in the radio/RADAR wavebands In a preferred embodiment of the apparatus and method, a correlative mathematical system or network is constructed at a computing device (processor) that will identify the refractive profile structure(s) from a priori knowledge of various infrared images that are created by a broad range of possible refractive profiles, boundary layer physical temperature profiles, and/or surface (sea surface, for example) temperatures. A preferred tool for constructing a correlative system is known as artificial neural networking (ANN) wherein, analogous to biological brain neurons, mathematical neuron models link correlated data through one or more layers. Suitable ANN training software include the MATLAB Neural Network Toolbox and the Stuttgart Neural Network Simulator. In this implementation, the observed infrared images in a selected waveband associated with the various refractive atmospheric constituents (and ancillary data content such as surface temperature and humidity, sea surface temperature and state, other available data having pertinent information content) are correlated with refractivity profiles across the electromagnetic spectrum and/or with water vapor and temperature profiles.

Figure 4:
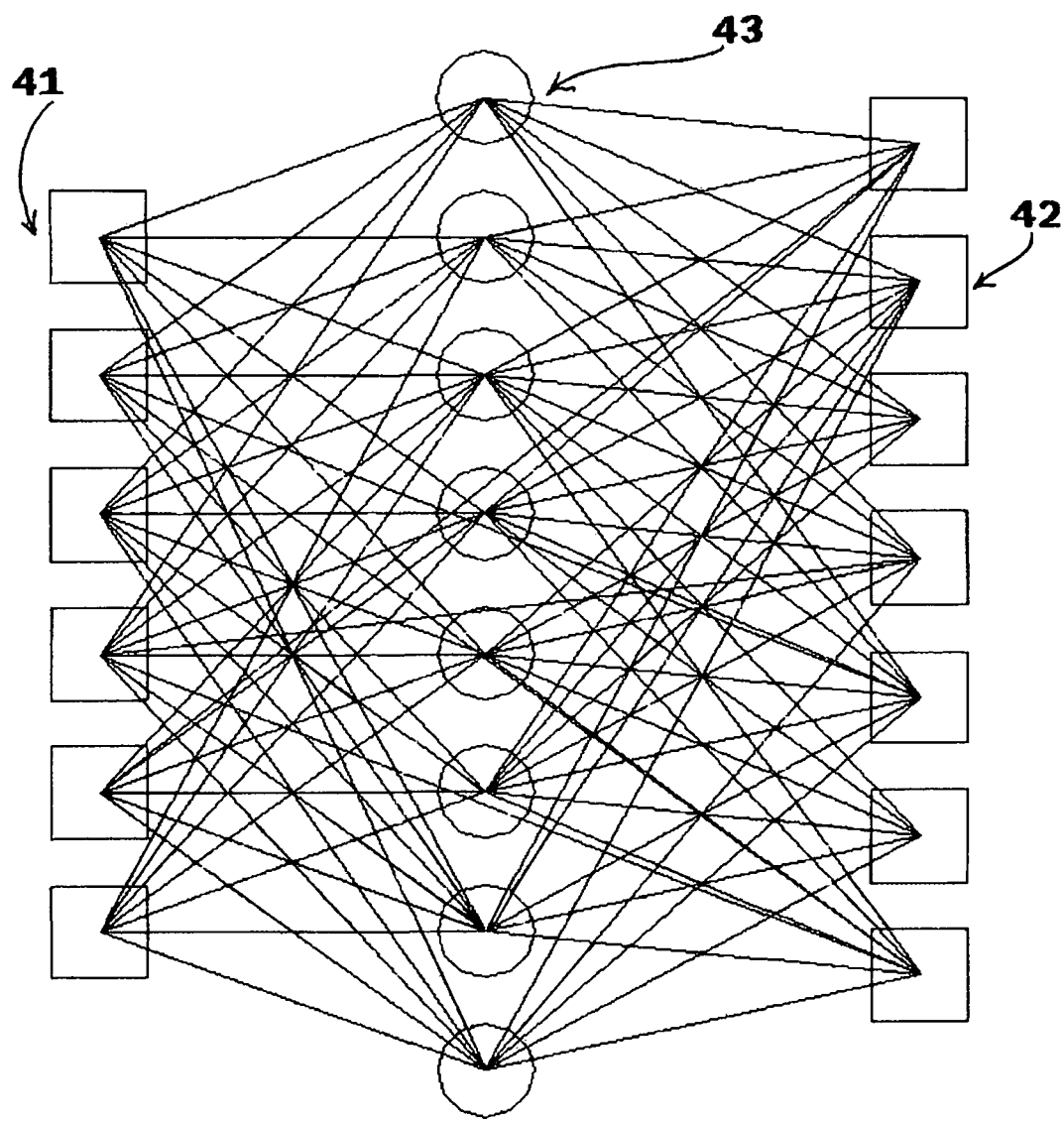
FIG. 4 is an illustration showing a simplified artificial neural network for use in this invention.

As shown in FIG. 4, an ANN is constructed of inputs 41 corresponding in this invention to infrared temperature profiles and ancillary data content and to refractivity profiles as a function of height of the observer above the surface and the waveband. Outputs 42 provide desired absorption and refractivity information as a function of wavelength, height of the imager above the surface, and other dependent inputs. These are connected through a layer or layers of neurons, with all layers and inputs and outputs connected to neuron nodes 43 and inputs and outputs in other layers. A training (learning) data set consisting of atmospheric and other input parameters and forward modeled output parameters is constructed in two parts correlating the input refractivity and water vapor and temperature profiles and ancillary data with the desired output information.

Figure 5:
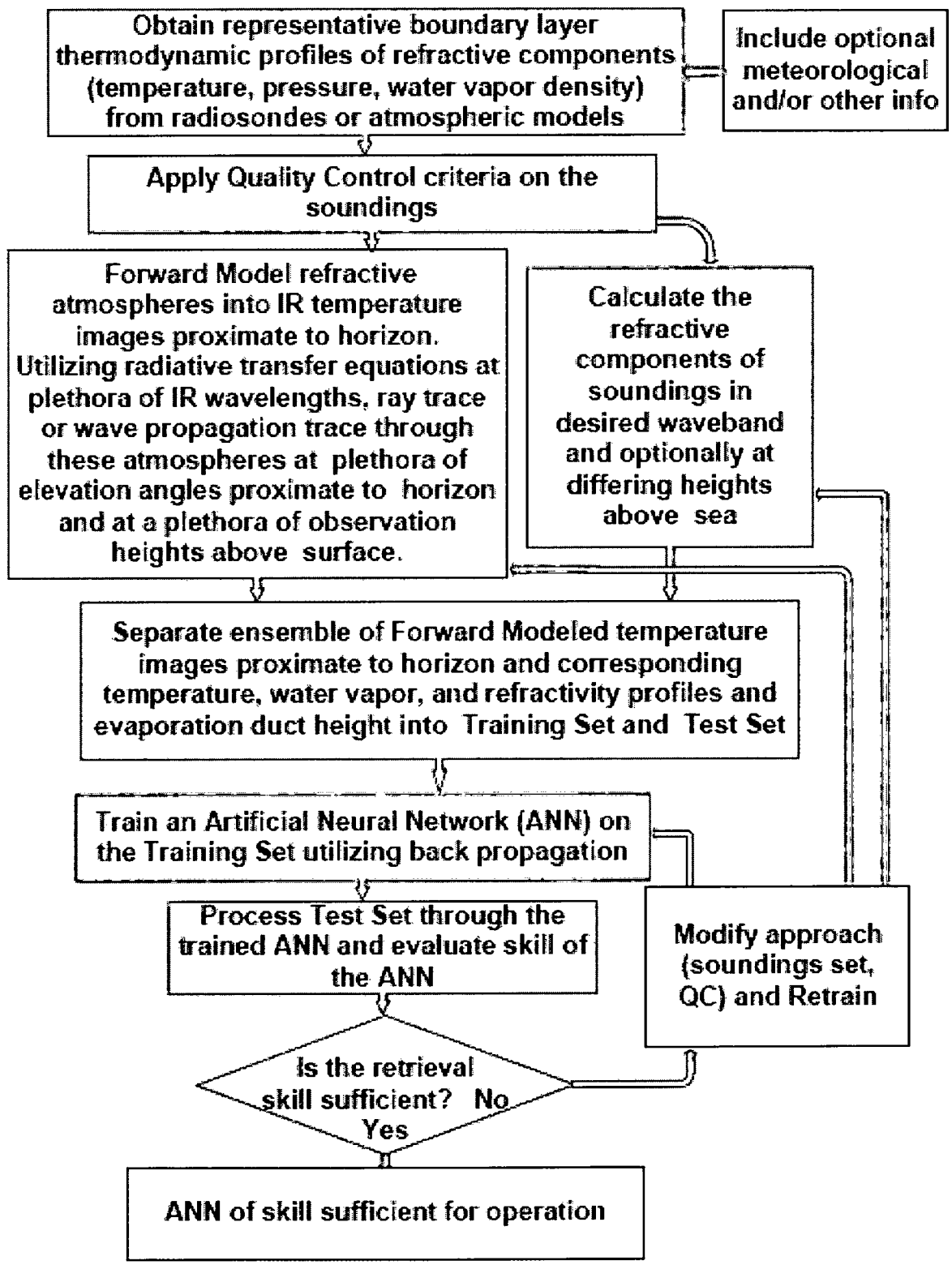
FIG. 5 is a flowchart of the training method for an artificial neural network used by this invention.

FIG. 5 illustrates the steps for generating a system of training and testing an ANN for interpreting IR waveband observations. As shown in FIG. 5 a set of refractivity profiles and/or water vapor and temperature profiles for the waveband of interest modeled or calculated from actual atmospheres are obtained from radiosondes (weather balloon sondes), numeric weather models, or other sources that have had quality control criteria applied. Ancillary meteorological data can be included in this data set.

Corresponding infrared temperature profiles that would be observed in observations/images proximate to the horizon at the selected waveband of interest and at the various heights of interest above the surface are calculated or forward modeled, utilizing ray tracing and/or wave propagation methods and radiative transfer models. This is optionally performed for this data set at differing heights of the observing apparatus above the sea surface.

These correlated data sets are separated into a training set and a test set. The training set is presented to the ANN resident in a computer or other processing device such as a properly programmed field programmable gate array (FPGA), and the strengths of the neurons are then calculated at 56 by training the neural network with a "back-propagation" method wherein all neurons are adjusted to maximize the correlation between the observable inputs and the forward modeled outputs in the training set. The "test" set of 10% to 20% of the correlated forward modeled infrared profiles or images and the observable inputs is held back from the training. This test set is used in a "feedforward" configuration after the completion of the ANN training to assess the skill of the system. If the skill is deemed insufficient, remedies and changes are implemented in the input data and the forward model, and the training and testing is repeated until a satisfactory result is obtained. If the skill of the ANN as demonstrated by the test set is deemed sufficient, the ANN training is finished.

Figure 6:
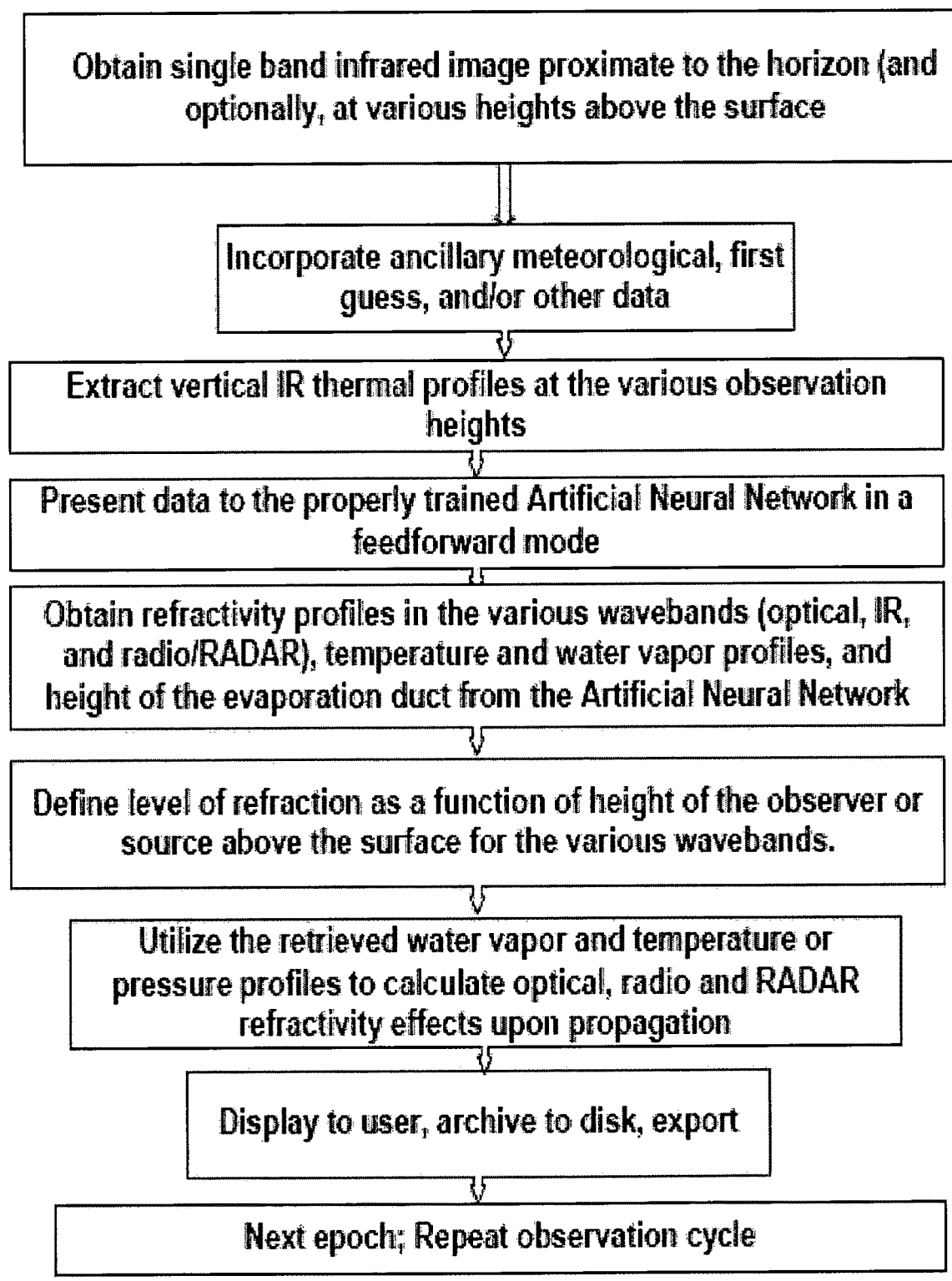
FIG. 6 is a flowchart of the method for inverting observed infrared spatial observations into water vapor, temperature, and refractivity profiles and propagation characteristics across the electromagnetic spectrum.

In FIG. 6, the method of using the sufficiently trained ANN for interpreting IR single waveband observations (typically in real time) to provide desired water vapor, temperature and refractivity profiles is shown. The trained ANN is used operationally on a computing device in the "feedforward" configuration (the reverse of the back-propagation configuration), with inputs consisting of the observables (infrared observations/images in the infrared waveband and heights above the surface and possible ancillary data utilizing apparatus of FIG. 1) and outputs 69 consisting of water vapor, temperature/pressure and refractivity profiles in the various wavebands.

IR temperature profiles and structure are extracted from the images obtained by the IR camera or IRT system (FIGS. 1 at 11 and 12). The various data (measured and modeled), including thermal data as a function of observing angle from below the horizon to near zenith, are processed to extract the infrared thermal (temperature) profiles in the selected waveband of interest. These images are quality checked for veracity and, along with pertinent meteorological and first guess information, are presented to the trained ANN.

Through the processor 21, the ANN outputs refractivity profiles in the observed waveband as well as the related profiles of water vapor and temperature (or pressure) and as a function of the height of the observer above the ocean surface. These retrievals are then utilized to calculate optical, radio and RADAR refractivity information of interest. The observation cycle is repeated. All data gathered can be further deployed in ongoing training of the ANN.

Figure 7:
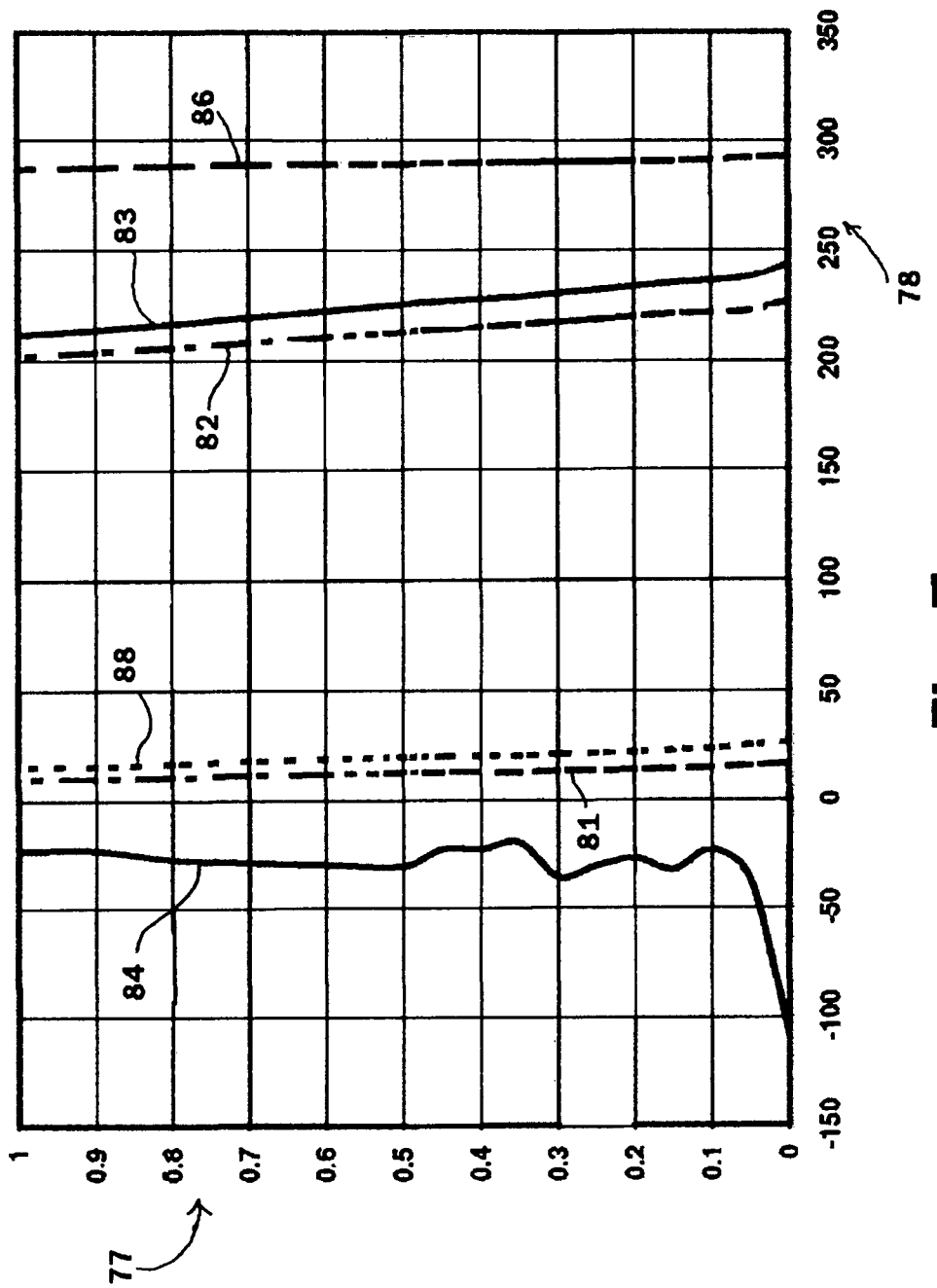
FIG. 7 is a graphical illustration of typical output data obtained by the apparatus and methods of this invention.

The data are then displayed to the operator or observer on the graphical screen of processor 21 or in other desired form, an example of which is shown in FIG. 7 (a display of water vapor, dry constituency, total refractivity, temperature profiles and other data). The vertical scale 77 is in kilometers, and the horizontal scale 78 is in accord with the parameters plotted. The refractivity due to water vapor in N units is shown at 81. The refractivity due to the dry constituency in N units is shown at 82, and the total refractivity in N units is shown at 83. The refractivity gradient dN/dh, change in N units per kilometer is shown at 84. Also shown are the retrieved temperature (Kelvins at 86) and water vapor density (grams per cubic meter at 88) profiles.

These direct retrieved results represent the different refractivity profiles in the various infrared wavebands. As there is no corresponding practical passive method for determination of refractive effects in other optical wavebands or the radio and RADAR wavebands, in this invention these longer wavelength effects are modeled by first determining the separate vertical distributions or profiles of water vapor and temperature and density from the refractive profiles that have been determined from the infrared spectrum or are direct outputs of the ANN. The refractive profiles, which are dependent upon frequency/wavelength, can be calculated from the determined temperature and water vapor profiles.

The Forward Modeled infrared signals are calculated through radiative transfer equations propagated through the atmosphere along the observation paths. The radiation intensity at frequency ν observed at an infrared thermometer or imaging camera of inwelling radiation from a non-scattering atmosphere (absence of hydrometeors, clouds, particulates, and aerosols) can be expressed using a modified form of the integral form of Chandrasekhar's Radiative Transfer Equation (RTE) for radiative propagation through an interactive medium:

$$I(\nu) = \int_{IRC}^{\infty \text{ or ocean}} T(s)\alpha(\mu,s)\exp(-\int_{IRC}^{s}\alpha(s')ds')ds + I_{ocean}\exp(-\int_{IRC}^{ocean}\alpha(\nu,s)ds)$$

where $I_c$ the received intensity at the IRT at frequency ν, IRC is the infrared camera position, ocean is the origin of emission from the ocean, should the ray path so intercept the ocean, T(s) is the atmospheric temperature at distance s from the IRC, and α(ν,s) is the atmospheric absorption at frequency ν and distance s from the IRC.

Optical depth or opacity τ is defined by the integral in the exponent in the above expression:

$$\tau = \int_{IR\ Camera}^{\infty} \alpha(\nu,s)ds$$

The atmospheric absorption coefficients in the infrared radiative transfer equation are quite well known. Such modeling can be accomplished through atmospheres calculated with atmospheric radiation propagation programs such as LOWTRAN, MODTRAN, or HITRAN.

Passive temperature profiling ability has applications in meteorology, battle scene environment and artillery and long range gunnery corrections, air quality (trapping inversions and boundary-layer thermodynamic stability, theta and theta-E), wind energy (flow stability), and ground based weather modification (trapping inversions and stability). Water in its three phases is the engine that drives much of meteorology with the capture and release of heat of fusion and heat of vaporization, and is therefore an important element in meteorology.

All opportune segments of the infrared spectrum can be utilized (spanning from about 0.8 microns to about 1000 microns). An opportune segment is defined as one that includes water vapor and $CO_2$ absorption in separate spectral bands with satisfactory transmission characteristics (for example, in addition to the 8 to 14 micron region as discussed hereinabove, the 3 to 5 micron band, the 1.5 to 2.7 micron band and others). Thus, images of infrared radiation emitted by water vapor and the dry constituency of the atmosphere in these several infrared wavebands may be used.

Figure 8:
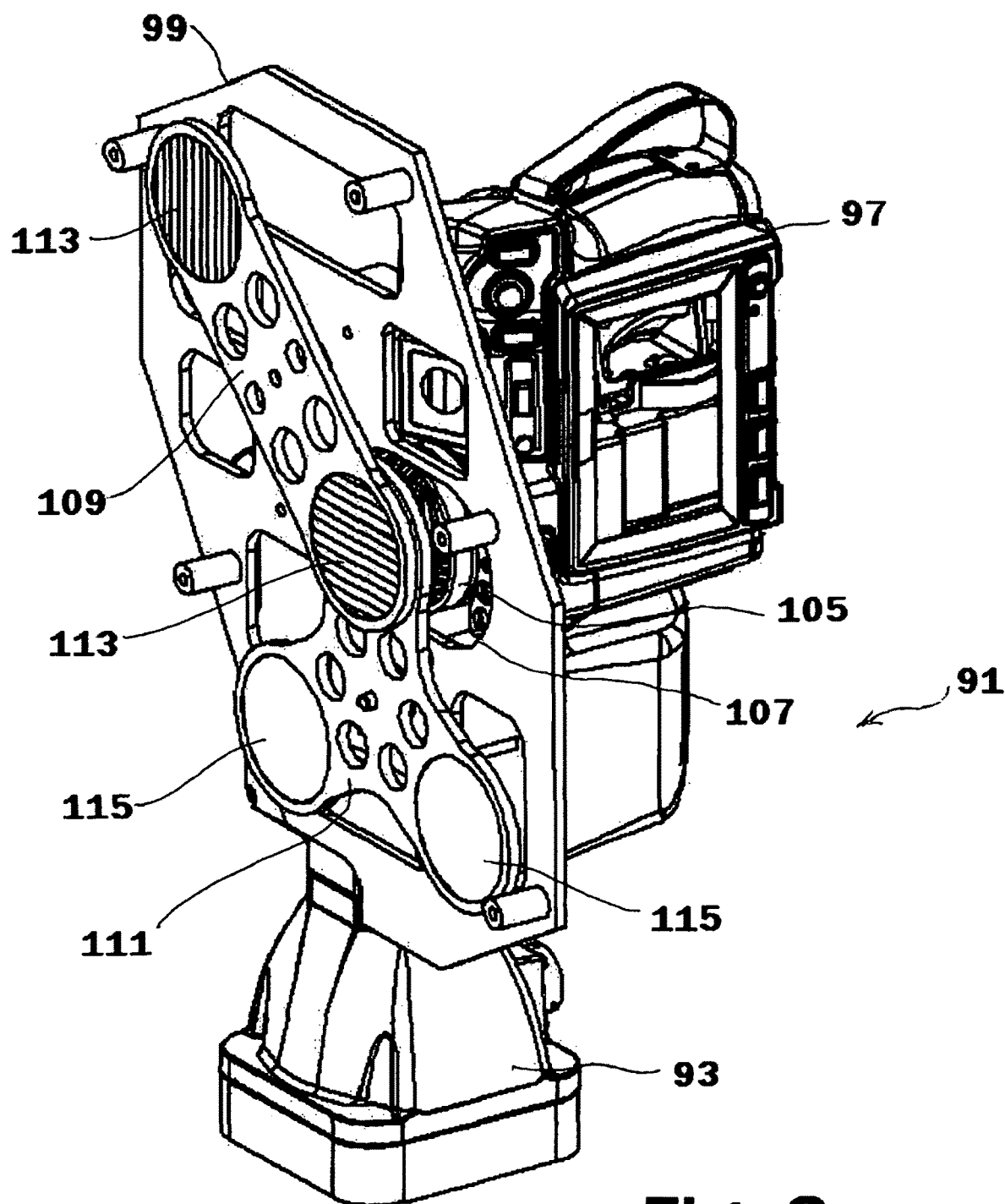
FIG. 8 is a perspective view of other apparatus of this invention.
Figure 9:
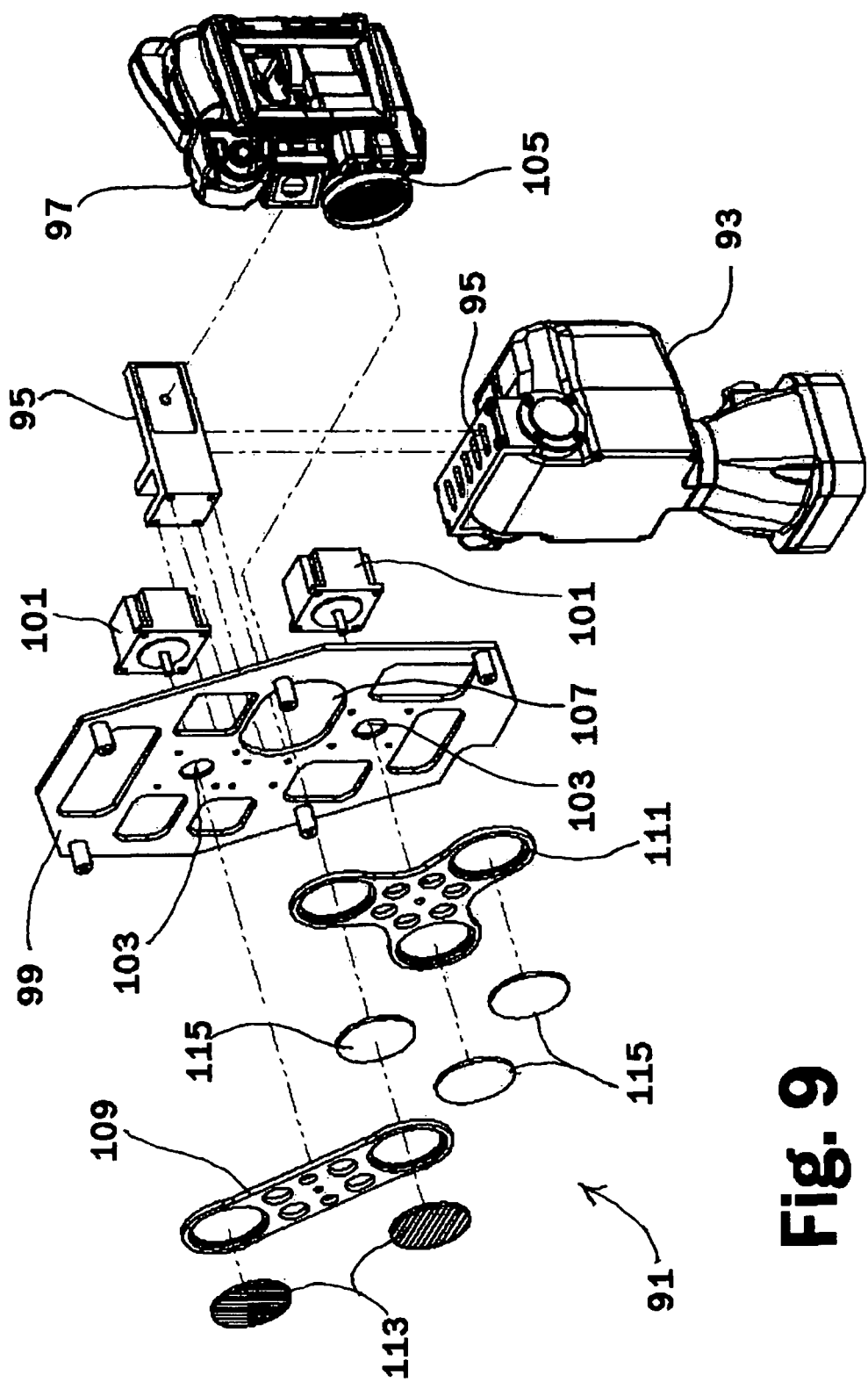
FIG. 9 is and exploded view of the various apparatus of FIG. 8.

Alternative apparatus are shown in FIGS. 8 and 9 in non-preferred embodiment of the invention. Embodiment 91 of noncontact receiver 10 which includes alternative applications and parts of the apparatus of this invention is shown in detail. Receiver 91 is adapted for mounting on an azimuth-elevation pointing system 93 (as are known) for controlling and measuring angular displacement of received emissions relative to a horizon. Mounting bracket system 95 are adapted to mount on system 93 and is configured for mounting of infrared camera 97 (a FLIR T650, for example) and mounting plate 99 thereat. Plated 99 has a number of openings therethrough, primary among them being stepper motors 101 shaft access openings 103 and camera lens 105 access opening 107.

Stepper motors 101 are mounted to plate 99. A plural diffraction grating mount 109 is pivotably affixed to the shaft of one of stepper motors 101 and a plural filter mount 111 is pivotably affixed to the shaft of the other of stepper motors 101. Diffraction gratings (polarizers) 113 are located in openings on mount 109, each a selected distance from its mounting to the stepper motor shaft selected so that the gratings can selectively be brought into alignment with lens 105 of camera 97 at opening 107. Likewise filters 115 (fixed and/or tunable bandpass filters, for example) are located at openings in mount 111 a selected distance from its mounting to the stepper motor shaft selected so that the filter can selectively be brought into alignment with lens 105 of camera 97 at access opening 107. These gratings and filters can be used for selectively isolating component emissions. The changeable bandpass filters and polarizers define the desired wavebands and polarizations for the infrared camera. Various input/output connectors (not shown) are provided for camera and lens, stepper motor, and pointing system data outputs and control inputs from a processor.

In operation using the preferred embodiment of this invention, images are captured by the small 8 to 14 micron thermal infrared camera 12, preferably a low cost infrared imager with fast frame rates (30 Hz), many pixels (hundreds of thousands), and high thermal resolution (~0.05 C). The images are then processed through a "retrieval method" (inverting observables into desired engineering units) to obtain all of the above-discussed tropospheric meteorological profiles. Numerous retrieval methods are available including physical retrievals, statistical retrievals, Bayesian maximum likelihood methods, Newtonian iterative methods, and artificial neural networks (ANNs).

Preferable, for example, images or other spatial observations of the sky are captured in a selected waveband as discussed above capturing water vapor signal and signal contributed to by the dry constituency. These images contain temperature gradients and structure in the infrared signal as a function of elevation angle of the observation above the horizon, wherein information on the vertical structure of the water vapor distribution, the temperature profile, and the refractivity profile are contained. The thermal signal in the first several angular degrees above the horizon are dominated by refractive effects, with water vapor dominating the thermal signal above those first several degrees of elevation, and physical air temperature dominating the thermal signal thereabove. Thus the single waveband thermal profile from the horizon upward contains information on the refractive, water vapor and air temperature vertical profile structure.

The pointing system enables collecting images from the horizon to zenith with a limited the field-of-view infrared camera. Inclusion of the optional azimuthal mount enables observations to be taken around the compass. The pointing system enables near-vertical observations of the sea surface to determine the sea surface skin temperature. This skin temperature is of value in a number of applications, including oceanography, meteorology, and climate monitoring. The images are fed into a processing system whereat profiles are extracted using the desired retrieval method. Because, among other information, the refractivity profile is resolved, the height of an evaporation duct (ducting of electromagnetic radiation will occur when the vertical refractive gradient is more negative than −157 N units per kilometer) over the ocean, for example, can be extracted by simple inspection of the refractivity profile.

The single waveband approach described hereinabove, not utilizing bandpass filters or polarizers, and instead utilizing full band analysis to recover profiles of temperature, relative humidity, and refractivity, is preferred for most applications. As is known, the absorption, and therefore by Kirchoff's Law, the emission of the atmosphere varies significantly across the 8 to 14 micron band. Thus, it seemed that sub-banding the IR camera into three bands of about 1.5 microns in width might mitigate range smearing. Subsequent in-depth Eigenvalue analysis of the skill of the infrared method of obtaining temperature, water vapor, and refractivity profiles across the LWIR atmospheric window yielded a counterintuitive result, however, when comparing skill of the non-preferred method utilizing sub-banding to the now preferred method utilizing the entire band as a single bandpass.

To determine optimum observing wavebands, Eigenvalue (Principal component) analysis via principal component analysis of the observables of the 8 to 14 micron waveband was utilized to determine the number of independent bits of information on the refractivity, temperature, and water profiles is present in the captured images. This analysis successively generates a set of orthogonal functions, representing orthogonal Eigenvectors, that diminish in length as the analysis proceeds. Eventually the Eigenvector length is below the noise level of the observation. Performing this analysis on a sub-banded 8 to 14 micron design, utilizing three sub-bands, and, alternatively, a design incorporating the entire 8 to 14 micron band, analysis utilizing a set of more than 9000 radiosondes (atmospheric temperature and water vapor and refractivity vertical profiles) to 10 km, the two methods produced almost identical results out to the $6^{th}$ Eigenvector, where the sub-banded method was only slightly superior.

In actual operation, because the temperature resolution of the infrared camera, NEDT, is inversely proportional to the band-pass, the thermal resolution (NEDT) would be degraded by a factor of four by sub-banding. Additionally, the requisite band-pass filters needed in for sub-banding also have losses. These losses are due to reflections from the surfaces of the filter and the loss in passing through the filter. The NEDT would increase from 0.05 C for full banding to about 0.5 C for the sub-banded method. These losses bring the sensitivity of the sub-banded method down by about a factor of 10, an order of magnitude. The full-band apparatus and method of this invention is therefore much more skilled and now much preferred to the multiband approach also taught herein.

As should be appreciated from the foregoing, the common meaning of the term "pixel" is intended, i.e. any of the small discrete elements that together constitute an image (as on a television or digital screen), or any of the detecting elements of a solid-state optical sensor (such as a CCD or CMOS or similar infrared devices). This includes that applied in the field of digital imaging, which is to say that a pixel (pel, or picture element) is a physical point in a raster image, or the smallest addressable element in an all points addressable display device (i.e., the smallest controllable element of a picture represented on a screen, for example). A camera is typically defined as a device that consists of a lightproof chamber with an aperture fitted with a lens through which the image of an object is projected onto a surface for recording.

The apparatus herein taught is thus quite unlike and readily distinguishable from a radiometer, which is defined by those skilled in the art as is a device for measuring the radiant flux (power) of electromagnetic radiation. Dependent upon the region of the electromagnetic spectrum detected, vastly different detection mechanisms and hardware and processing methods are required in application of known radiometer, vastly differing physics and mathematics are utilized, and vastly different observations are obtained.

For devices sensing radiation in the radio region (including microwave radiometers), radio receiver architectures are utilized to detect signals from a single antenna that observes a single spot or field-of-view with simple detection diode mechanisms. Because of the low radiant flux energy, amplification on the order of 60 dB (gain of one million) is required, but the simple Rayleigh-Jeans formula can be utilized to process the flux into desired parameters.

$$I_{Rayleigh-Jeans}(\lambda, T) = \frac{2kT}{\lambda^4}$$

Because of the high energy of the radiant photon flux in the optical region (including the infrared), millions of times greater than in the radio (including the microwave) region, bolometer arrays or epitaxial solid state structures such as HdCdTe arrays or the like detection methods are possible without amplification. Because of the very short wavelengths, large x-y arrays of very small pitch (e.g., 20 microns) individual sensing locations are utilized to capture images of a field of view consisting of hundreds of thousands of individual image pixels, resolving into a high resolution 2 dimensional image analogous to film cameras. Because the emitting atomic electronic transitions being observed are Quantum Mechanical, the complex Planck's Law is required to process into desired engineering units. This expression requires the transcendental logarithm base e.

$$I_{Planck}(\lambda, T) = \frac{2\pi hc^2}{\lambda^5 [e^{hc/\lambda kT} - 1]}$$

DIFFERENCE/COMPARISON TABLE A

| Parameter | Microwave radiometer | Infrared Imaging Camera |
| --- | --- | --- |
| Wavelength | Centimeters to millimeters | Microns, 1/1000 of centimeters |
| Radiance Theory required | Simple Rayleigh-Jeans Law | Quantum Mechanical Planck's Law |
| Observation cycle time | Many seconds | 1/30 second |
| Data processing | Rayleigh Jeans direct measure | Quantum Mechanical Planck Function |
| Beam widths | Single antenna beamwidth of degrees in width | Hundredths of degrees for each of many hundred thousands of pixels in each image |
| Typical independent measurements in the observations | 3 to 4 Eigenvalues | 8 Eigenvalues |
| Field of view | Single spot | Hundreds of thousands of elements in x-y grid arrays, forming an image. |

It is well known to the skilled person in the art that microwave radiometers (including millimeter wave devices) are radio receivers using radio antennas and are thus capable only of receiving radio signals from a single source, or position of the sky field of view. Microwave/millimeter wave emissions and infrared emissions are distinct wavebands in the electromagnetic spectrum and one does not (as pertinent to this Application) include the other. No one skilled in the art would consider the 8 to 14 micron range to be other than the longwave infrared portion of the electromagnetic spectrum.

In the optical region (including the infrared), where the Quantum Mechanical Planck's law applies such that the individual photons in the emitted fluxes at environmental temperatures are 10,000 time more energetic and the total flux energy (photon energy times the number of photons) is about 1.2 billion times as great, large arrays of hundreds of thousands or millions of detectors on a single substrate are enabled thus capturing resolute images of the entire field of view in much shorter observation times. Thus, a multiple pixel (i.e., multiple detector) infrared image detecting device and a radiometer receiver device are quite distinct devices and understood to be so by those skilled in the art. Moreover, each requires distinct operation, embodiment, application, and processing (not applicable to the other).

Thus, as specifically taught hereinabove, apparatus and methods are provided using a passive noncontact infrared image detection device capable of capturing images each including multiple pixels for receiving and making observations of infrared emissions in the longwave infrared portion of the electromagnetic spectrum (preferably the 8 to 14 micron range waveband). An output indicative of the infrared emissions received is thus generated. Means are provided for measuring angular displacement of received infrared emissions relative to a horizon associated with the detection device and providing spatial output indicative thereof. A processor is established for receiving the outputs and for operationally converting output indicative of received and observed infrared emissions into equivalent Planck blackbody temperatures and for correlating structure and vertical distribution of these temperatures to provide profiles of interest.

What is claimed is:

1. Apparatus for characterizing tropospheric boundary layer thermodynamic and refractivity profiles of interest utilizing selected waveband infrared observations comprising:
   a passive noncontact thermal infrared camera for capturing a multiple pixel image of infrared emissions in the infrared portion of the electromagnetic spectrum and for providing output indicative thereof;
   means for measuring spatial displacement of received emissions relative to a horizon associated with said camera and providing output indicative thereof; and
   a processor for receiving said outputs and having programming including a correlative system constructed by correlating a priori infrared spatial observations in waveband of interest with a priori refractivity profiles across the electromagnetic spectrum and a priori water vapor and temperature or pressure profiles and means for processing said outputs with the correlative system to thereby obtain profiles of interest including boundary layer refractivity profiles of interest, water vapor profiles of interest, and temperature or pressure profiles of interest.

2. The apparatus of claim 1 wherein said processor programming means for processing said outputs includes converting said output indicative of received and observed infrared emissions into equivalent Planck blackbody temperatures and correlating structure and vertical distribution of said temperatures to provide said profiles of interest.

3. The apparatus of claim 1 wherein said processor includes means for defining level of refraction of the thermodynamic profiles of interest at the waveband of interest as a function said spatial displacement output including height above the observational surface adjacent to the boundary layer.

4. The apparatus of claim 3 further comprising utilizing said thermodynamic profiles and said level of refraction to calculate all optical, radio and RADAR waveband propagation path refractivity at said processor.

5. The apparatus of claim 1 wherein said means for measuring spatial displacement includes an azimuth-elevation pointing system.

6. The apparatus of claim 5 further comprising a mounting bracket system attachable with said pointing system and adapted for mounting of said camera thereat.

7. The apparatus of claim 1 further comprising at least one additional noncontact thermal infrared camera.

8. The apparatus of claim 1 wherein
   said passive noncontact infrared camera is characterized as an image detection device capable of capturing a plurality of images, each of said images including multiple pixel observations of said infrared emissions in the 8 to 14 micron range waveband of the electromagnetic spectrum and for providing output indicative thereof, wherein said
   means for measuring spatial displacement measures angular displacement of received emissions relative to said horizon and providing spatial output indicative thereof, and
   wherein said means for processing of said processor includes means for converting output indicative of received and observed infrared emissions into equivalent Planck blackbody temperatures and for correlating structure and vertical distribution of said temperatures to provide said profiles of interest.

9. The apparatus of claim 8 wherein said noncontact infrared image detection device is characterized by having up to about a 30 Hz frame rate, hundreds of thousands pixels per frame, and ~0.05 C thermal resolution.

10. The apparatus of claim 8 wherein said noncontact infrared image detection device is an infrared camera.

11. The apparatus of claim 8 further comprising means for isolating component emission at said receiver includes at least one of a fixed filter, a tunable filter or a diffraction grating for selecting desired wavebands or bandpasses in the infrared.

12. The apparatus of claim 8 further comprising a focusing system for focusing emissions to be received at the detection device.

13. The apparatus of claim 8 wherein said means for converting output indicative of received and observed infrared emissions into equivalent Planck blackbody temperatures and for correlating structure and vertical distribution of said temperatures to provide said profiles of interest includes a neural network trained utilizing thermodynamic and refractive profiles of soundings at desired wavelengths and infrared temperature observations forward modeled from selected atmospheres.

14. The apparatus of claim 8 wherein the thermodynamic profiles of interest include water vapor profiles and temperature or pressure profiles.

15. The apparatus of claim 14 wherein said processor includes means for defining level of refraction of the thermodynamic profiles of interest at the waveband of interest as a function said spatial output including height above the observational surface adjacent to the boundary layer and utilizing said thermodynamic profiles and said level of refraction to calculate optical, radio and RADAR waveband propagation path refractivity.

16. The apparatus of claim 8 wherein said passive noncontact infrared image detection device is a thermal infrared camera and wherein said processor for receiving said outputs including said means for converting output indicative of received and observed infrared emissions into equivalent Planck blackbody temperatures and for correlating structure and vertical distribution of said temperatures to provide said profiles of interest includes programming embodying a correlative system constructed by correlating a priori infrared spatial observations in waveband of interest with a priori refractivity profiles across the electromagnetic spectrum and a priori water vapor and temperature or pressure profiles, said programming for processing said outputs with said correlative system to thereby obtain boundary layer refractivity profiles of interest, water vapor profiles of interest, and temperature or pressure profiles of interest.

17. The apparatus of claim 16 wherein said processor includes means for defining level of refraction of the thermodynamic profiles of interest at the waveband of interest as a function said spatial displacement output including height above the observational surface adjacent to the boundary layer.

18. The apparatus of claim 17 further comprising utilizing said thermodynamic profiles and said level of refraction to calculate optical, radio and RADAR waveband propagation path refractivity at said processor.

* * * * *

UNITED STATES PATENT AND TRADEMARK OFFICE
CERTIFICATE OF CORRECTION

| | | |
|---|---|---|
| PATENT NO. | : 11,614,367 B2 | Page 1 of 1 |
| APPLICATION NO. | : 16/974132 | |
| DATED | : March 28, 2023 | |
| INVENTOR(S) | : Fredrick Solheim | |

It is certified that error appears in the above-identified patent and that said Letters Patent is hereby corrected as shown below:

In the Specification

Column 1, insert:
--Government Support
This invention was made with U.S. government support under contract(s) (N00014-16-P3028 and N6833518 C0261) awarded by (the United States Navy). The government has certain rights in the invention.--

Signed and Sealed this
Third Day of December, 2024

Katherine Kelly Vidal
*Director of the United States Patent and Trademark Office*